United States Patent [19]
Ramsay

[11] 3,880,749
[45] Apr. 29, 1975

[54] APPARATUS FOR DETERMINING VACUUM IN CLOSED CANS

[75] Inventor: Joseph D. Ramsay, Woodbury, N.J.

[73] Assignee: Campbell Soup Company, Camden, N.J.

[22] Filed: June 10, 1974

[21] Appl. No.: 477,673

[52] U.S. Cl. .................. 209/80; 324/162; 324/161; 324/174; 340/265
[51] Int. Cl. ............................................. B07c 3/10
[58] Field of Search ......... 209/81, 81 A, 80, 73, 74, 209/82, 88; 324/161, 162, 163, 173, 174; 340/265

[56] References Cited
UNITED STATES PATENTS

| | | | |
|---|---|---|---|
| 3,392,829 | 7/1968 | Keinanen | 209/80 X |
| 3,441,132 | 4/1969 | Browning | 209/80 |
| 3,465,878 | 9/1969 | Ochs | 209/80 |
| 3,469,689 | 9/1969 | O'Neill, Jr. | 209/80 |
| 3,586,165 | 6/1971 | Keinanen | 209/80 |
| 3,700,101 | 10/1972 | Ference | 209/80 |
| 3,793,890 | 2/1974 | Anderson | 324/162 |

*Primary Examiner*—Allen N. Knowles
*Attorney, Agent, or Firm*—John W. Logan, Jr.

[57] ABSTRACT

Apparatus for determing the degree of vacuum in closed cans is disclosed including means to sense the degree and direction of curvature of the central circular area of the can end and produce an electric signal proportional to the degree and direction of curvature and also proportional to the degree of vacuum or pressure in the can together with means to compare the electric signal with a standard to determine if a predetermined degree of vacuum is in the can. In a specific embodiment, a pivoted arm carries a follower which follows the contour of the can end and a core of a velocity transducer connected to the arm causes the velocity transducer to produce a signal varying with the vertical velocity of movement of the follower. This signal is differentiated to produce an electric signal whose strength is proportional to the acceleration of the follower. A selected portion of the acceleration signal is integrated producing an output signal varying in voltage and polarity with the degree of vacuum or pressure in the can. This output signal is compared with a standard to determine if the can being tested contains at least a predetermined degree of vacuum, and cans without sufficient vacuum are rejected.

21 Claims, 12 Drawing Figures

APPARATUS FOR DETERMINING VACUUM IN CLOSED CANS

The present invention relates to new and useful improvements in apparatus for determining vacuum in closed cans and more particularly to apparatus which will determine the degree of vacuum in closed cans passing along a conveyor and reject from the conveyor those cans which do not have sufficient vacuum.

Conventional can ends have a central circular area which normally lies in a flat plane. This area of the can end will be concave inwardly in a sealed can containing a vacuum, will be flat in a sealed can with no vacuum and will bulge outwardly in a sealed can having an internal pressure greater than atmospheric pressure. In most canned food products, lack of vacuum in the can indicates that the can has a small leak either along the side seam or at the end seal permitting air to enter the can. A leak of this type could permit contamination of the product in the can leading to undesirable bacteria growth. If cans are tested some length of time after they are sealed and processed, a lack of vacuum in the can would indicate that the can either leaks and thus would be subjected to possible contamination or that the food in the can has been inadequately processed. Accordingly, it is desirable to provide apparatus which can accurately and quickly determine if adequate vacuum exists in a closed can. Apparatus has been provided in the past which will measure the height of the center of a can end from a base to determine the amount of deflection of the center of the can end and thus determine if an adequate vacuum exists in the can. However, apparatus of this type is not suitable for the rapid and continuous testing of sealed cans in that cans of any one type or size will vary slightly in height requiring a new zero setting for the apparatus for each can tested.

In the apparatus of the present invention means is provided to pass over a diameter of the central portion of a can end while the can is moving along a conveyor to sense the degree and direction of curvature of the can end and produce an electric signal proportional to the degree and direction of curvature of the can end and compare this signal with a standard to determine if a predetermined vacuum exists in the can. In one embodiment of the invention, this means consists of a follower member which is provided to ride across the central portion of the can end along a diameter of the can end while the can is moving along a conveyor and be displaced vertically following the contour of the central portion of the can end with the displacement dependent upon the vacuum or pressure within the can. The movement of this follower is transmitted to the core of a velocity transducer which produces an electric signal output proportional to the velocity of movement of the core or follower. The output signal of the velocity transducer is then passed through a differentiator which differentiates the signal and produces an electric signal whose strength and polarity is proportional to the change in velocity, or more accurately, the acceleration of movement of the follower. As more fully described hereinafter, the acceleration of movement of the follower can be related substantially directly to the displacement of the central portion of the can end away from a flat plane and to the vacuum or pressure within the can so that the electric signal representative of the acceleration of the follower will be proportional to the vacuum or pressure within the can. This electric signal representative of the acceleration of the follower is then compared to a standard and if the signal does not meet or exceed the standard, the can is rejected as not containing adequate vacuum.

With the foregoing in mind, a primary object of the present invention is to provide novel apparatus for determining the degree of vacuum in a can quickly and efficiently and without requiring constant adjustment.

Another object of the present invention is to provide novel apparatus which will test cans moving continuously and in close order at a rapid speed along a conveyor to determine if the cans contain some minimum standard of vacuum and reject from the conveyor those cans which do not have adequate vacuum.

A further object of the present invention is to provide novel apparatus for producing an electric signal whose strength and polarity is proportional to acceleration of movement of a follower across the central portion of a can end and also proportional to the degree of vacuum or pressure within the can.

Still a further object of the present invention is to provide novel apparatus for sampling a portion of an electric signal obtained from the acceleration of movement of a follower across the central portion of a can end to obtain an output signal which can be compared with a standard to determine the acceptability of the tested can.

A still further and most important object of the present invention is to provide novel apparatus for determining the degree of vacuum or pressure in a closed can including means to sense the degree and direction of curvature of the central portion of the can end and produce an electric signal which is a function of the degree of vacuum or pressure within the can and further including means to compare the electric signal produced with a standard to determine if at least a predetermined vacuum exists in the can.

A still further object of the present invention is to provide novel apparatus having the features and characteristics set forth above which will operate efficiently and effectively for long periods of time with minimum maintenance and adjustment.

These and other objects of the present invention and the various features and details of the operation and construction thereof are hereinafter more fully set forth and described with reference to the accompanying drawings, in which:

FIG. 4b is a diagram illustrating the electrical signal produced by the velocity transducer as the follower passes over the can end with the signal related to the contour of the can end as shown in FIG. 4a;

Figure 5A:
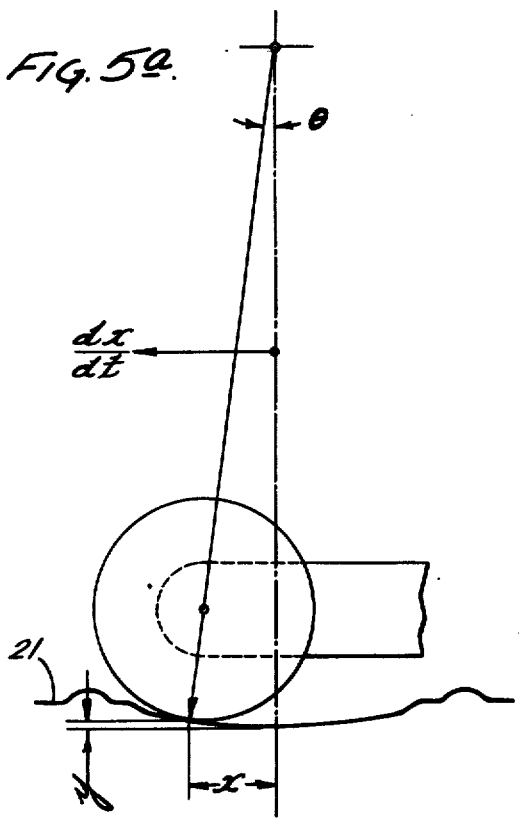
FIGS. 5a and 5b are schematic diagrams showing the curvature and dimensions to be measured in the can end for the purpose of producing the desired output signal.
Figure 5B:
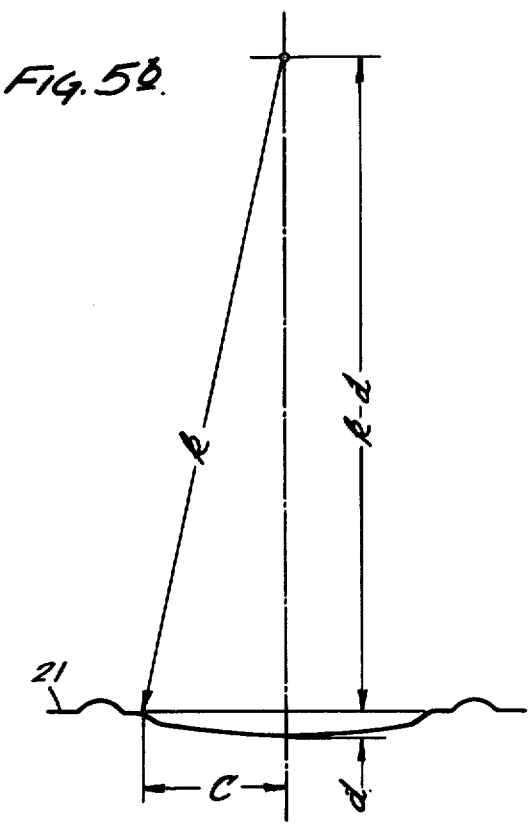

Referring first to FIGS. 5a and 5b, there is illustrated various dimensions of a central portion of a can end and movement of a follower. FIG. 5a shows the movement of a can under a small follower creating a displacement of the follower in a vertical direction. The displacement depends upon the curvature of the lid and the horizontal position ($x$) of the can. Assuming the curvature along a diameter of the lid to be an arc of a circle, the displacement of the follower ($y$) may be expressed mathematically as follows:

$$y = \pm (k - k \cos \theta) \quad (1)$$

Where $k$ is the radius of the curve followed by the wheel and the sign of the right-hand side of the equation depends upon whether the center of curvature is above or below the ($x$) axis. The angle ($\theta$) is measured from the vertical as shown.

Cans are assumed to be moving at a rate of 300/min. with 6 inch separations. Hence the speed in the $x$ direction is:

$$\frac{dx}{dt} = \frac{300 \times 6}{60} = +''/\text{sec}.$$

The angular velocity of the radius ($k$) about the center of curvature, as drawn from the center of curvature to the point of contact of the wheel with the lid is:

$$\frac{d\theta}{dt} = \frac{\frac{dx}{dt}}{k} \quad \text{All angular quantities are in radians} \quad (2)$$

The rate of change of the displacement ($y$) with respect to time ($t$) is the velocity:

$$\frac{dy}{dt} = \frac{dy}{d\theta} \cdot \frac{d\theta}{dt} \quad (3)$$

The first term on the right-hand side in Eq. 3 may be found by differentiating Eq. 1, and the second term is Eq. 2 with $(dx)/(dt) = 30$. Hence, $$\frac{dy}{dt} = (\pm k \sin \theta) \, 30/k = \pm 30 \sin \theta \quad (4)$$

The rate of change of the velocity is the acceleration, and may be obtained by differentiating Eq. 3:

$$\frac{d^2y}{dt^2} = \frac{dy}{d\theta} \cdot \frac{d^2\theta}{dt^2} + \frac{d\theta}{dt} \cdot \frac{d}{dt} \cdot \frac{(dy)}{(d\theta)} \quad (5)$$

The angular velocity $(d\theta)/(dt)$, from Eq. 2, is assumed to be constant at ($30/k$) rad./sec., hence the angular acceleration $(d^2\theta)/(dt^2)$ is zero and the first term on the right side of Eq. 5 disappears. Eq. 5 then simplifies to:

$$\frac{d^2y}{dt^2} = \frac{d\theta}{dt} \cdot \frac{d}{dt} \cdot \frac{(dy)}{(d\theta)} = \frac{d\theta}{dt} \cdot \frac{d}{d\theta} \cdot \frac{(dy)}{(dt)} \quad (6)$$

Differentiating Eq. 4, and substituting in Eq. 6 gives:

$$\frac{d^2y}{dt^2} = \pm \frac{30}{k} \cdot 30 \cos\theta = \pm \frac{900}{k} \cos\theta \quad (7)$$

For valves of $\theta$ smaller than $\pm .2$ radians $\cos \theta$ is essentially constant and in the range of $.99 \pm .01$. Hence, to a close approximation, $$\frac{d^2y}{dt} = \pm \frac{900}{k} \quad (8)$$

With reference to FIG. 5b, the radius ($k$) of the curvature of a can lid (assumed to be circular) is related to the deflection ($d$) at the center of the lid by the following:

$$k^2 - {}^*C^2 = (k - d)^2$$
$$\text{or}$$
$$k^2 - C^2 = k^2 - 2kd + d^2$$
$$\text{Solving for } k \text{ gives}$$
$$k = \frac{C^2 + d^2}{2d}$$

Since ($d$) is much smaller than C, ($d^2$) may be neglected. Hence, to a close approximation, $$k = \frac{C^2}{2d} \quad (9)$$

*C is one half the diameter of the central portion of the can end.

From equations (8) and (9) it can be seen that the acceleration of the follower varies inversely with the radius of curvature of the central portion of the can end and that the radius of curvature of the central portion varies inversely with the deflection of the center of the can end. Thus, the acceleration of the follower varies directly with the amount of the deflection of the can end, with the amount of deflection of the can end depending directly upon the degree of vacuum or pressure in the can.

From experimental work done in measuring lid depressions of size 211 × 400 cans under different degrees of exhausted vacuum, the following empirical formula was found to relate the depression ($d$) to the absolute pressure ($p$), to reasonable accuracy:

$$d = \frac{(30-p)0.6}{150} \quad (10)$$

Where ($d$) is in inches, and ($p$) is in in. Hg.

Figure 1:
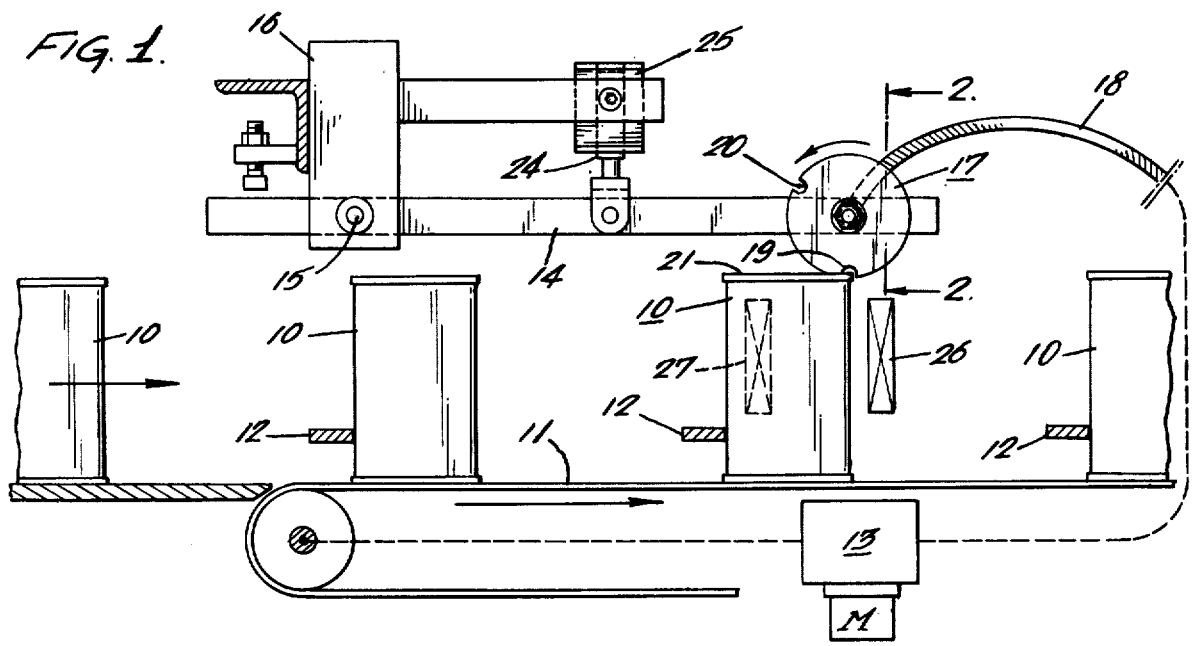
FIG. 1 is a side elevational view illustrating a schematic representation of apparatus for determining vacuum in closed cans.

From equations (9), (10) and (7) a complete mathematical simulation was made for an apparatus designed along the lines of FIG. 1 in which the vertical acceleration of the axis of the follower wheel would be obtained from a suitable sensor and electronic differentiator combination.

The simulation showed predicted data on acceleration, curvature, radius of curvature, and lid depression as related to absolute internal pressure over a range of 0 inch to 60 inches Hg., for a can moving at a speed of 150 feet/min., as follows:

VACUUM DETECTING DEVICE PROBE ACCELERATION vs INTERNAL PRESSURE

| Absolute Pressure In. Hg. | Lid Depression Inches | Radius of Curvature Inches | Direction of Curve | Acceleration In/Sec² |
|---|---|---|---|---|
| 0 | .0513 | 21.9 | Down | 41.05 |
| 5.0 | .0460 | 24.5 | " | 36.79 |
| 10.0 | .0402 | 28.0 | " | 32.18 |
| 15.0 | .0339 | 33.2 | " | 27.08 |
| 20.0 | .0265 | 42.4 | " | 21.23 |
| 22.0 | .0232 | 48.5 | " | 18.57 |
| 24.0 | .0195 | 57.6 | " | 15.63 |
| 26.0 | .0153 | 73.5 | " | 12.25 |
| 28.0 | .0101 | 111.3 | " | 8.08 |
| 30.0 | .0000 | ∞ | Flat | 0.00 |
| 32.0 | −.0101 | 111.3 | Up | −8.08 |
| 34.0 | −.0153 | 73.5 | " | −12.25 |
| 36.0 | −.0195 | 57.6 | " | −15.63 |
| 38.0 | −.0232 | 48.5 | " | −18.57 |
| 40.0 | −.0265 | 42.4 | " | −21.23 |
| 45.0 | −.0339 | 33.2 | " | −27.08 |
| 50.0 | −.0402 | 28.0 | " | −32.18 |
| 55.0 | −.0460 | 24.5 | " | −36.79 |
| 60.0 | −.0513 | 21.9 | " | −41.05 |

Above simulation for size 211 × 400 cans running at 150 ft./min. Atmospheric pressure assumed at 30 in. Hg.

If the above is plotted the result will show the relationship between acceleration of the follower and vacuum in the can. Thus, an electric signal whose strength and polarity is a function of acceleration may be used to determine the vacuum or pressure in the can.

One embodiment of apparatus for determining the existence of a particular degree of vacuum or pressure in a closed can is illustrated in FIG. 1. Closed sealed cans 10 are carried along a conveyor 11 at a uniform speed. The cans 10 are spaced at predetermined uniform intervals by means of movable pusher members 12 which travel along with the conveyor 11. The conveyor 11 in turn is driven by means of a motor and transmission unit 13.

In accordance with the present invention means are provided to sense the contour of the central portion of the can and produce an electric signal which varies with changes in the contour of the can end. In the illustrated embodiment of the present invention, this is accomplished by means of a light weight arm 14 extending in the direction of movement of the conveyor above the cans and pivoted in bearings as indicated at 15 to a stationary support member 16. The outer end of the arm 14 carries a rotatable follower wheel 17 driven by a flexible shaft 18 from the conveyor drive 13 so that the peripheral speed of the wheel is the same as the linear speed of the conveyor.

Figure 3:
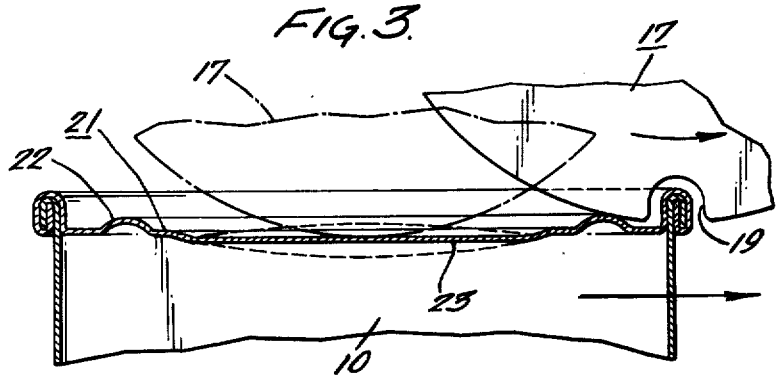
FIG. 3 is an enlarged fragmentary sectional view of a can end with the follower mechanism in position on top of the can end.
Figure 2:
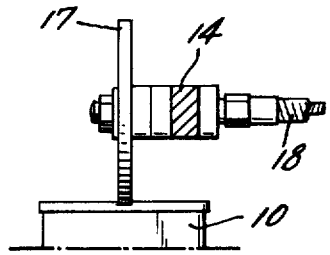
FIG. 2 is a transverse sectional view taken along line 2—2, FIG. 1 illustrating the follower mechanism for following the contour of the can end.

This follower wheel 17, as shown in FIGS. 2 and 3, rides across the diameter of the can end as the can travels along the conveyor 11 beneath the arm 14. Notches 19 and 20 are provided in the periphery of the wheel to pass over the lip at the periphery of the can end so that the wheel and arm 14 do not bounce unduly as the wheel initially engages or leaves a can. As seen in FIG. 3, the can end 21 is attached to a can 10 by the conventional end seal forming the lip of the can. Spaced inwardly from the lip of the can is a raised strengthening rib 22 and inwardly from the strengthening rib is a slightly recessed circular disc-like portion 23 which normally lies in a flat plane in a can containing atmospheric pressure. If the can contains pressure less than atmospheric pressure the disc-like portion 23 of the can end will be concave inwardly from its normal flat planar position with the degree of deflection of its midpoint varying with the degree of vacuum contained within the can. Similarly, if the can contains pressure greater than atmospheric pressure the disc-like portion 23 at the center of the can end will be convex outwardly with its outward deflection depending upon the degree of pressure above atmospheric pressure contained within the can.

As the wheel initially engages the can the notch 19 passes over the leading edge of the lip of the can so that the periphery of the wheel engages the surface of the can end. The wheel closely follows the contour of the can end and will be moved vertically, pivoting the arm 14 about its pivot 15 as the wheel passes over raised portions or depressions in the can end. The portion of movement of the wheel which is of particular interest in this invention is that portion of movement of the wheel which is caused by deflection of the central disc-like portion 23 of the can end.

Carried by the arm 14 intermediate the pivot point 15 for the arm and the wheel 17 is a permanent magnet core 24 of a linear velocity transducer 25. The linear velocity transducer 25 is of conventional construction and for example may be a linear velocity transducer, type 050 VG-A, sold by Schaevitz Engineering Company of Pennsauken, N.J. This transducer includes a coil surrounding the permanent magnet core 24 which produces an output signal proportional to the velocity of movement of the core as the core moves within the coil. This output signal is a relatively small signal and is measured in millivolts per inch per second.

Figure 4A:
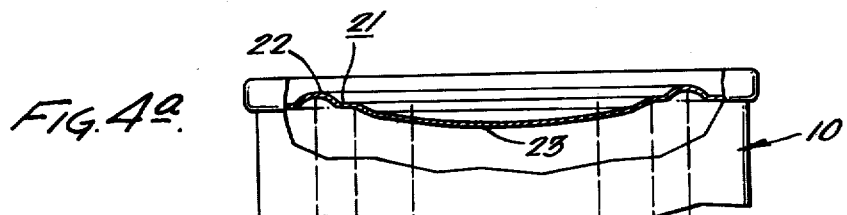
FIG. 4a is a fragmentary transverse sectional view through a can end.
Figure 4B:

FIG. 4b illustrates graphically the output signal of the velocity transducer 25 as the follower wheel passes over a can end having a contour as shown in FIG. 4a. In FIG. 4a the central disc-like portion of the can end is deflected downwardly indicating the existence of a vacuum within the can. As shown in FIG. 4b there is a series of rapid peaks and valleys in the signal as the follower wheel passes over the irregularities in the contour of the can used by the strengthening rib and initial depressed portion at the edges of the central disc-like portion 23. These peaks and valleys in the signal are of no interest and are eliminated from the measured portion of the signal as more fully described hereinafter. However, as the follower wheel follows the concave contour of the disc-like portion of the can end the vertical velocity of movement of the wheel vary from a maximum at the periphery of the disc-like portion to zero at the center of the disc-like portion and then to a maximum in the opposite direction at the opposite periphery of the disc-like portion. The signal produced by the velocity transducer 25 during this these of the can beneath the follower wheel is representative of the velocity of vertical movement of the wheel and will follow a generally straight line path from a maximum negative quantity through zero to a maximum positive quantity, as shown in FIG. 4b. There will of course be some extraneous noise and vibrations which will cause a series of small jagged peaks and valleys following generally along this straight line relationship of FIG. 4b but thise will generally balance each other out and for the purpose of this invention can be ignored.

Figure 4C:
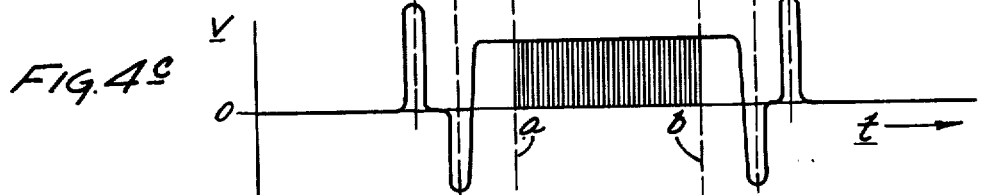
FIG. 4c is a diagram illustrating the signal representative of acceleration of the follower, which signal is produced by differentiation of the signal of FIG. 4b.

An important feature of the present invention is taking the signal of the chart of FIG. 4b from the velocity transducer and differentiating this signal to obtain a signal representative of acceleration of movement of the following wheel in the vertical direction. The result of this differentiation of the signal of FIG. 4b is shown in the chart of FIG. 4c. As shown in FIG. 4b, the velocity is changing substantially along a straight line and thus the derivative of the velocity signal, which gives acceleration of the follower in a vertical direction, is substantially constant. This produces, as shown in FIG. 4c, an electric signal whose voltage is substantially constant during that period the follower is passing over the concave central disc portion of the can end. As described previously, the acceleration of the follower wheel in a vertical direction is a function of and is substantially proportional to the vacuum in the can. Accordingly, the strength and polarity of the central portion of the acceleration output signal may be used to give an indication of the degree of vacuum or pressure within the can being tested.

If the can being tested contained pressure above atmospheric pressure instead of vacuum, the central disc portion of the can end would be convex upwardly instead of concave downwardly as shown in FIG. 4a. The velocity curve of FIG. 4b for this can would be similar to that now shown in FIG. 4b except that the central portion of the velocity curve would slope downwardly in FIG. 4b instead of upwardly as shown. If this velocity output signal was differentiated an acceleration signal similar to that shown in FIG. 4c would be obtained except that the polarity of the acceleration signal would be negative instead of positive. Similarly, if the pressure in the can were equal to atmospheric pressure and the central disc portion of the can end were flat there would be no movement of the follower in a vertical direction so that the velocity curve for a flat can end would be a straight line along the zero voltage axis. Differentiating this zero signal to obtain acceleration would give a zero signal for acceleration which would indicate that atmospheric pressure existed within the can.

Figure 4D:
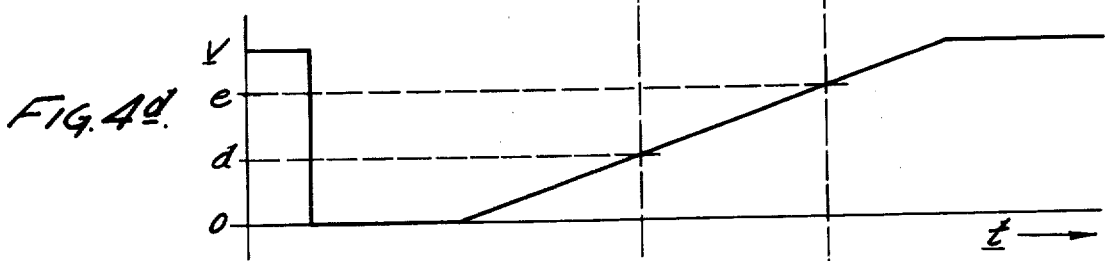
FIG. 4d is a diagram showing the time base signal used to select the portion of the signal of the diagram of FIG. 4c to be measured.
Figure 4E:
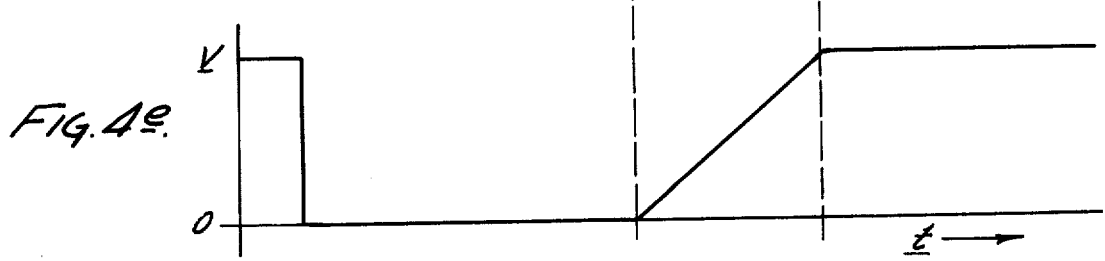
FIG. 4e is a diagram illustrating the result of measurement of the signal of FIG. 4c.

In accordance with the present invention means is provided to obtain an output signal which is reasonably free of noise and which accurately represents the acceleration of the follower wheel in a vertical direction as it passes over the central portion of the can end. This is accomplished by integrating the central portion of the acceleration output signal over a period of time to obtain a final noise-free output signal representative of acceleration over a period of time which may then be compared with a standard to determine if the can has adequate vacuum. Accordingly, the central shaded portion of FIG. 4c between the lines a and b is integrated or totalled over a period of time to obtain the signal as shown in FIG. 4e. Integration of this signal is accomplished by means of a three-mode integrator which has a reset mode, an integrate or compute mode and a hold mode. During the integrate or compute mode of the three-mode integrator that central shaded portion of the acceleration curve of FIG. 4 is integrated over a predetermined period of time and at the end of this period of time the three-mode integrator is switched to the hold mode to provide an output signal which is of uniform strength and which is held until the signal is compared with a standard more fully described hereinafter. Thereafter the three-mode integrator is changed to the reset mode and remains in the reset mode until the start of the next integrate or compute mode.

For uniform repeatability of accuracy of the three-mode integrator, it is necessary to have a very accurate time base to start and stop the compute or integrate mode of the three-mode integrator. This is accomplished by providing a repeating time base signal or voltage which increases uniformly along a straight line and which will start the integrate mode of the three-mode integrator when the voltage reaches a first predetermined point and will stop the integrate mode of the three-mode integrator when the voltage reaches a second predetermined point. Accordingly, a two-mode integrator is provided to produce this time base signal. The two-mode integrator is provided to produce this time base signal. The two-mode integrator is similar to the previously described three-mode integrator but only has a reset mode and an integrate mode. During the integrate mode the voltage builds up uniformly along a straight line to a predetermined point or to saturation at which point the voltage is held until the two-mode integrator is reset. FIG. 4d shows the output signal from the two-mode integrator which is used as the time base for the three-mode integrator to get the signal of FIG. 4e. When the two-mode integrator is in its integrate mode, voltage is increasing in a straight line relationship with time as shown in FIG. 4d, and when the voltage reaches the level d the two-mode integrator produces a signal which starts the integrate mode of the three-mode integrator. When the voltage of the two-mode integrator reaches the point e the time base signal stops the integrate mode of the three-mode integrator and converts it to the hold mode.

Means are provided in the apparatus of the present invention to start and reset the two-mode integrator at the proper time with respect to movement of the cans beneath the follower wheel so that the integrate mode of the three-mode integrator integrates or totals over a period of time the central shaded portion of the acceleration curve of FIG 4c. This is accomplished by providing a pair of photoelectric cells 26 and 27 along the path of travel of the cans. As the can being tested reaches the photoelectric cell 26 a signal is produced which initiates the integrate mode for the time base signal. This integrate mode continues until its signal reaches a predetermined level or saturation as shown in FIG. 4d. Thereafter, the reset mode of the time base signal is initiated when the next adjacent can on the conveyor reaches a position adjacent the trailing photocel 27. This photocell 27 produces a signal which resets both the time base signal of the two-mode integrator and also resets the three-mode integrator.

Figure 6:
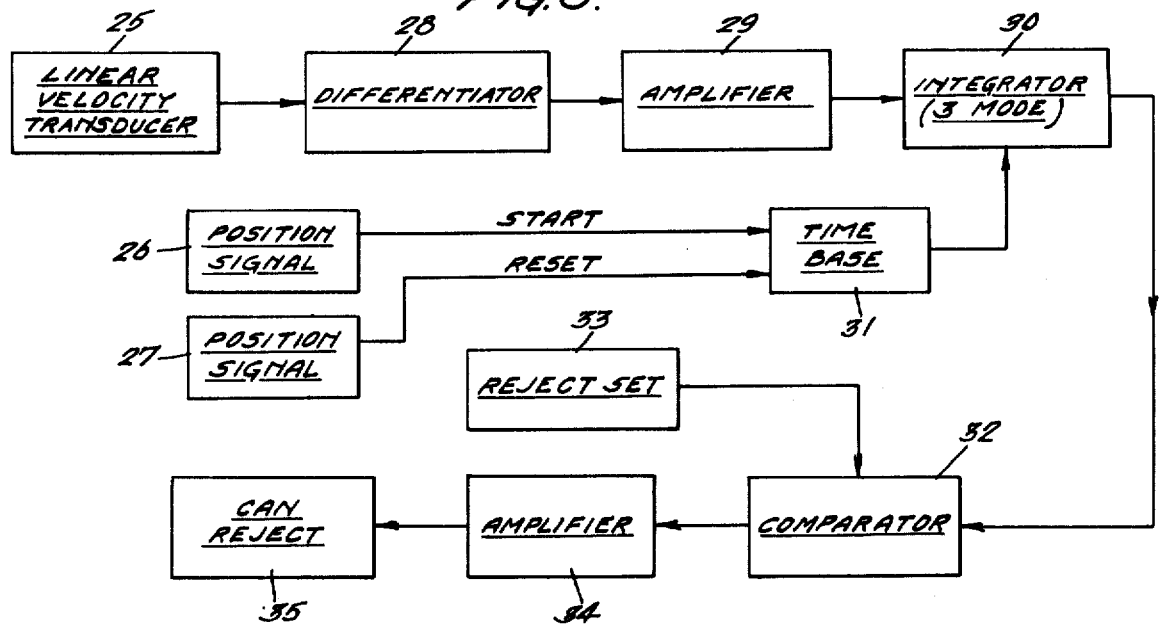
FIG. 6 is a block diagram of the circuitry for producing the output signal and comparing the output signal with a standard for the purpose of determining the acceptability of the can being tested.

FIG. 6 illustrates diagrammatically the circuitry for producing a signal representative of acceleration in the vertical direction of the follower wheel 17 and for comparing this signal with a standard to accept or reject cans being tested depending on the degree of vacuum within the can. As shown in FIG. 6, the signal from the linear velocity transducer is fed to the differentiator 28 which in turn produces a signal such as that shown in the chart of FIG. 4c. This signal is scaled by an adjustable gain amplifier 29 and is supplied to the input of the three-mode integrator 30. Also, an operating signal is supplied to the control for the three-mode integrator by the time base 31. The time base receives a start position signal from the photocell 26 and a reset position signal from the photocell 27. As a result of receiving the time base signal and the signal from the differentiator, the three-mode integrator produces the hold signal which is that constant voltage signal as shown at the right-hand side of the chart of FIG. 4e.

Figure 7:
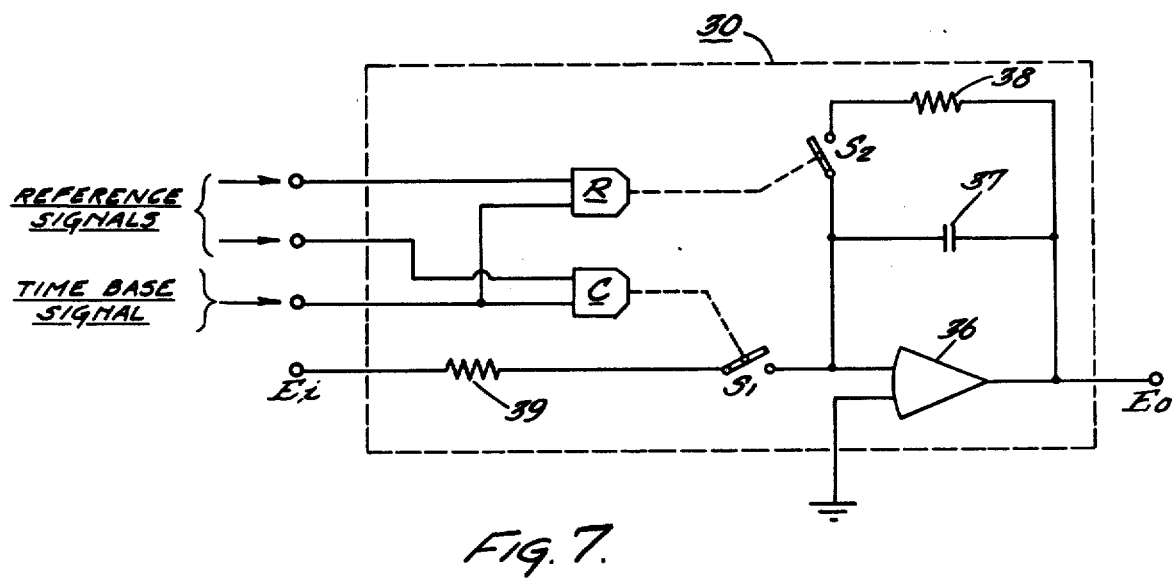
FIG. 7 is a circuit diagram of the three-mode integrator utilized in the present invention.

The three-mode integrator may be of standard form, such as a Model 4850 three-mode integrator manufactured by Teledyne Philbrick Nexus Company of Dedham, Massachusetts. The operation of this three-mode integrator may be more fully understood with reference to FIG. 7. In FIG. 7 there is shown the three-mode integrator 30 which receives an input signal $E_i$ from the differentiator 28 through the amplifier 29 and produces an output signal $E_o$. The output signal $E_o$ may be expressed by the formula $$E_0 = - \frac{1}{R_i C_f} \int_0^t E_i dt,$$

where $R_i$ is the resistance of the resistor 39 and $C_f$ is the capacitance of the capacitor 37. The three-mode integrator includes a high gain amplifier 36 bridged by an integrating capacitor 37 and a resistor 38 as shown in FIG. 7. A pair of switches $S_1$ and $S_2$ are provided to control the modes of the integrator. An operating comparator C and a reset comparator R control operation of the switches $S_1$ and $S_2$ respectively. The time base signal from the two-mode integrator of the time base 31 is fed to both the operating comparator C and the reset comparator R. This time base signal is compared by these comparators with their respective reference signals which have previously been individually preset.

At the start of a cycle, both $S_1$ and $S_2$ are closed. As the signal from the time base 31 increases, the reset comparator R opens switch $S_2$ to initiate the integrating mode of the three-mode integrator. This integrates that shaded portion of FIG. 4c to produce the output voltage as shown by the chart of FIG. 4e. As the time base signal further increases in voltage, the compute comparator C opens the switch $S_1$ to terminate the integrate mode and start the hold mode of the three-mode integrator to produce the final output voltage $E_o$ which is the signal that is compared with a standard reference signal to determine the degree of vacuum in the can, as more fully described hereinafter. When the time base signal is reset by receipt of a signal from the photocell 27, the time base voltage drops to zero. As the time base voltage drops to zero the reset comparator R and the compute comparator C function to close their respective switches $S_2$ and $S_1$ to place the three-mode integrator in its reset mode and in condition for the start of another cycle of operation.

The held signal produced by the three-mode integrator representative of acceleration of the follower wheel in a vertical direction is then fed to a reject comparator 32 which compares the held signal with a standard reference signal. The reference signal is supplied to the reject comparator by means of the reject set circuitry 33 which may be a scaling circuit to provide a predetermined voltage signal to the reject comparator. If the held signal supplied to the reject comparator does not equal or exceed the reference signal supplied to the reject comparator by the scaling circuit the reject comparator will transmit a signal which may be amplified by an amplifier 34 and then supplied to the can reject mechanism 35 to reject from the conveyor 11 that can which caused the initiation of the can reject signal and which did not contain an adequate degree of vacuum.

The above describes a particular embodiment of mechanism in accordance with the present invention for determining the existence of a particular degree of vacuum or pressure in a closed can. It will be apparent however that various modifications may be made to this system. For example, an accelerometer could be used in place of the linear velocity transducer to produce a signal representative of the acceleration in the vertical direction of the follower wheel. If an accelerometer was used in place of the velocity transducer the differentiator of FIG. 6 could be eliminated and the signal from the accelerometer fed directly to the three-mode integrator. Also a displacement transducer could be used in place of the velocity transducer. If a displacement transducer is used the signal from this displacement transducer can be differentiated to obtain a signal representative of velocity, which signal would be similar to the signal from the velocity transducer.

From the foregoing it will be observed that the present invention provides novel apparatus which will determine if adequate vacuum exists in closed cans passing along a conveyor at a high speed and reject from the conveyor those cans which do not have adequate vacuum.

While a particular embodiment of the present invention has been illustrated and described herein it is not intended to limit the invention to such a disclosure and changes and modifications may be incorporated and embodied therein within the scope of the following claims.

I claim:

1. Apparatus for determining vacuum in a closed container such as a can having a can end with a central circular area normally lying in a flat plane and which is concave inwardly in a sealed can containing vacuum and convex outwardly in a sealed can having an internal pressure greater than atmospheric pressure; means to sense the degree of curvature and direction of curvature of the central circular area of the can end and produce an electric signal which is a function of the degree and direction of the curvature of the central portion of the can end, and means to compare said electric signal with a standard to determine if a predetermined vacuum is in said can.

2. Apparatus in accordance with claim 1 in which said sensing means includes a follower member mounted to move in a direction substantially normal to the surface of the can end in accordance with changes in contour of the can end, and means associated with said follower member to produce said electric signal in accordance with movement of said follower member in said normal direction.

3. Apparatus in accordance with claim 2 in which said follower member engages the surface of said can end and moves in said direction substantially normal to said can end following changes in contour of the can end.

4. Apparatus in accordance with claim 3 in which said follower member is carried by a movable arm, said arm lying in a plane substantially parallel to the plane of the can end and movable out of said plane in response to movement of said follower member, and said means to produce said electric signal includes a member carried by and movable with said arm.

5. Apparatus in accordance with claim 4 in which said containers are carried by a conveyor positioned beneath said arm and move in an upright position at a uniform rate of speed beneath said follower, and said follower member moves vertically to follow changes in the contour of said can end.

6. Apparatus in accordance with claim 5 in which said follower member is a rotatable wheel adapted to engage and roll across a diameter of said can ends as said can ends move beneath said wheel, and drive means to rotate said wheel so that the peripheral speed of said wheel is substantially the same as the linear rate of travel of said cans.

7. Apparatus in accordance with claim 6 including means providing notches in the periphery of said wheel adapted to pass over raised lips about the periphery of said can ends to prevent undue vertical movement of the wheel as the wheel initially engages a can end.

8. Apparatus in accordance with claim 2 in which the means to produce said electric signal includes an electric circuit which creates a signal that is a function of the acceleration of movement of the follower member as said follower member moves in said direction normal to the surface of said can end.

9. Apparatus in accordance with claim 8 in which said electric circuit includes a velocity transducer interconnected with said follower member to initially produce an electric signal which varies with changes in velocity of movement of said follower member in said direction normal to the surface of said can end.

10. Apparatus in accordance with claim 9 in which said velocity transducer includes a stationary coil and a movable magnetic core member, and means mounting said core member to move within said coil and with said follower member in a direction normal to the surface of said can end.

11. Apparatus in accordance with claim 9 in which said electric circuit further includes a differentiator to differentiate the electric signal initially produced by the velocity transducer and obtain a signal which is a function of acceleration of movement of said follower member.

12. Apparatus in accordance with claim 11 including means to sample a predetermined portion of the signal produced by said differentiator due to changes in the contour of said central circular area of said can end, and the said means to compare said electric signal compares said sampled portion of said signal with said standard.

13. Apparatus in accordance with claim 12 in which said sampling means comprises an integrator to intergrate said predetermined portion of said electric signal produced by said differentiator.

14. Apparatus in accordance with claim 13 in which said integrator comprises a three-mode integrator having an integrate mode, a hold mode and a reset mode, and control means to start and stop the integrate mode of said three-mode integrator during the portion of movement of said follower member caused by the central circular portion of said can end.

15. Apparatus for determining vacuum in a closed container such as a can having a can end with a central circular area normally lying in a flat plane and which is concave inwardly in a sealed can containing vacuum and convex outwardly in a sealed can having an internal pressure greater than atmospheric pressure; a follower member adapted to follow the contour of the can end and move in a direction substantially normal to the plane of said can end in accordance with changes in the contour of the can end, a velocity transducer associated with said follower member to produce an electric signal which varies in accordance with the velocity of movement of the follower member caused by changes in the contour of the can end, means to differentiate the electric signal produced by the velocity transducer to produce an electric signal representative of the acceleration of movement of the follower caused by changes in the contour of the can end, means to sample a predetermined portion of the acceleration signal caused by changes in the contour of the central circular area of the can end, and means to compare said sampled portion of the acceleration signal with a present standard to determine if the tested container has at least a predetermined internal vacuum.

16. Apparatus in accordance with claim 15 in which cans are caused to pass beneath said follower member in an upright position at a uniform rate of speed, and said follower member moves in a vertical direction in accordance with changes in the contour of the can end.

17. Apparatus in accordance with claim 16 in which the means to sample said predetermined portion of said acceleration signal comprises an integrator which integrates said predetermined portion of said acceleration signal and produces an output signal which is compared with said preset standard.

18. Apparatus in accordance with claim 17 in which said integrator is a three-mode integrator having an integrate mode, a hold mode and a reset mode, and control means to start and stop the integrate mode of said three-mode integrator.

19. Apparatus in accordance with claim 18 in which said control means comprises a two-mode integrator which produces a time base signal whose voltage increases uniformly with passage of time, said time base signal starting the integrate mode of said three-mode integrator when the voltage of the time base signal reaches a first predetermined level and stopping the integrate mode of said three-mode integrator when the voltage of said time base signal reaches a second predetermined level.

20. Apparatus in accordance with claim 19 including means to start and reset the time base signal in accordance with the position of containers beneath said follower member.

21. Apparatus in accordance with claim 20 including means to reject containers from said conveyor if the vacuum in said container is not at least at a predetermined level, and means to actuate said reject means if the sampled portion of said acceleration signal does not meet said preset standard.

* * * * *